United States Patent [19]
Tulai

[11] Patent Number: 5,563,942
[45] Date of Patent: Oct. 8, 1996

[54] DIGITAL CALL PROGRESS TONE DETECTION METHOD WITH PROGRAMMABLE DIGITAL CALL PROGRESS TONE DETECTOR

[75] Inventor: Alexander F. Tulai, Nepean, Canada

[73] Assignee: Mitel Corporation, Ontario, Canada

[21] Appl. No.: 199,482

[22] Filed: Feb. 22, 1994

[51] Int. Cl.$^6$ .................................................. H04M 3/22
[52] U.S. Cl. ........................ 379/351; 379/372; 379/386
[58] Field of Search .................................. 379/346, 350, 379/351, 372, 386, 67, 88, 89, 282

[56] References Cited

U.S. PATENT DOCUMENTS

| | | | |
|---|---|---|---|
| 3,937,899 | 2/1976 | Denenberg | 379/282 |
| 4,223,185 | 9/1980 | Picou | 379/283 |
| 4,286,326 | 8/1981 | Houdard | 379/386 |
| 4,405,833 | 9/1983 | Cave et al. | 379/372 X |
| 4,626,629 | 12/1986 | Premoli et al. | 379/386 |
| 4,694,482 | 9/1987 | Reesor et al. | 379/27 |
| 5,163,050 | 11/1992 | Cromack | 379/351 |
| 5,251,256 | 10/1993 | Crowe et al. | 379/386 |
| 5,319,703 | 6/1994 | Drory | 379/351 |
| 5,353,345 | 10/1994 | Galand | 379/386 |
| 5,371,787 | 12/1994 | Hamilton | 379/386 |
| 5,483,593 | 1/1996 | Gupta et al. | 379/386 |

FOREIGN PATENT DOCUMENTS 2166925  5/1986  United Kingdom .......... H04Q 1/457

OTHER PUBLICATIONS

"A Digital Receiver for Tone Detection Applications", Claasen et al., IEEE Transections or Communications, vol. Com-24, No. 12, pp. 1291-1300, Dec. 1976.

*Primary Examiner*—Jeffery Hofsass
*Assistant Examiner*—Scott L. Weaver
*Attorney, Agent, or Firm*—Charles E. Wands

[57] ABSTRACT

The present invention relates to a method of detecting call progress tones specified in a tone plan, comprised of calculating a power spectrum of a segment of an input signal containing a call progress tone, discriminating, based on the power spectrum, likely frequencies of the call progress tone, determining likely tone plan frequency bands based on between one and three of the frequencies, filtering the input signal in the frequency bands and extracting quadrature components of the input signal thereby, calculating three spectral moments of the input signal from the quadrature components for the frequency bands, and verifying at least one frequency of a call progress tone contained in the input signal based on the spectral moments.

17 Claims, 2 Drawing Sheets

DIGITAL CALL PROGRESS TONE DETECTION METHOD WITH PROGRAMMABLE DIGITAL CALL PROGRESS TONE DETECTOR

FIELD OF THE INVENTION

This invention relates to telephony, and in particular to a programmable digital tone detector for detecting call progress tones and for distinguishing them from other signals such as speech.

BACKGROUND TO THE INVENTION

Call progress tones are signals in the audible frequency band which are provided to a telephone caller during the progress of setting up, holding or lo transferring the call, such as busy tone, ring back tone, dial tone, etc. Call progress tones consist single frequency and dual-frequency combinations sinusoidal voltages which are applied in specific cadences, e.g. the length of time the tone is on or of and its repetition pattern.

The frequency components of a call progress tone are identified by its numerical frequency, measured in Hz, a frequency tolerance (±Hz) and intensity level (dBm). Speech signals are characterized by irregular bursts of combinations of many frequency components, and have non-specific on and of patterns.

Various countries use different call progress tone standards and with cadencing plans different from each other. It is important for a telephone switching system that is to be sold in various countries to have a programmable call progress tone detector in order to easily configure the switching system to the needs the particular country in which the system is to be sold.

SUMMARY OF THE INVENTION

The present invention is a digital call progress tone detector that can be implemented in a digital signal processor and which can detect a call progress signal or speech signal represented by samples s(kT) taken at different intervals T, wherein a typical value for T is 125 microseconds. When the system is set up, it is programmed by supplying a description of the call progress tones to be detected (called a Tone Plan), as a collection of frequencies, each frequency having the following parameters:

Algorithm Independent Parameters (1) Nominal frequency (Hz);

(2) Frequency deviation (Hz);

(3) Number of microseconds before reporting on the status of the tone.

The last-noted parameter is required for the detection of continuous tones.

Algorithm Dependent Parameters (1) Minimum power threshold for a typically 128 point real Fast Fourier Transform;

(2) A lower frequency boundary;

(3) An upper frequency boundary;

(4) A minimum bandwidth threshold.

The set of independent parameters is generally determined based on the standards or on the plan found in the field and used in the territory in which the switching equipment containing a call progress detector is deployed. The algorithm dependent set of parameters is a function of the algorithm independent parameters and can be determined based on off-line simulation.

In the case of a digital signal processor (DSP) based implementation of the present invention, a description of the Tone Plan can be sent via messages to the detector and to the DSP, while in the case of a hardware implementation it can be done by writing the Tone Plan values into hardware registers. Once the Tone Plan information is received, the detector is ready to operate.

Upon detection of a signal containing one or two frequencies that conform to the description given in the Tone Plan data, the detector informs the main switching processor via messages, via specially designated registers, etc., about the time of arrival and about the frequencies detected. The time of arrival can be given using a time stamp.

Upon the detection of the departure of a signal that has been identified and reported as a valid tone of the Tone Plan, the detector informs the main processor or the DSP with regard to the time of departure.

However in the case of continuous tones, after a predetermined interval of time has expired, the main processor is informed about the continuing presence of the tone, the arrival of which was previously announced.

In accordance with an embodiment of the invention, a method of detecting call progress tones specified in a tone plan is comprised of calculating a power spectrum of a segment of an input signal containing a call progress tone, discriminating, based on the power spectrum, likely frequencies of the call progress tone, determining likely tone plan frequency bands based on between one and three of the frequencies, filtering the input signal in the frequency bands and extracting quadrature components of the input signal thereby, calculating three spectral moments of the input signal from the quadrature components for the frequency bands, and verifying at least one frequency of a call progress tone contained in the input signal based on said spectral moments.

BRIEF INTRODUCTION TO THE DRAWINGS

A better understanding of the invention will be obtained by reference to the detailed description below, in conjunction with the following drawings, in which:

FIG. 1 is a block diagram illustrating the functional elements of an embodiment of the invention, FIG. 1A illustrates the signal as being processed in an envelope detector and represents a progress tone, FIG. 1B illustrates the signal as being processed in an envelope detector and is representative of speech or another signal other than a progress tone, and FIG. 2 is a block diagram illustrating in more detail the block of FIG. 1 in which the quadrature components are determined.

DETAILED DESCRIPTION OF THE INVENTION

The present invention can provide the time of arrival and departure and an indication of a frequency component or the frequency components of an input signal for use by a main system controller (e.g. a telephone switching system controller) to determine precisely what an input tone signal is. In another embodiment, however, that information can be provided to a digital signal processor which itself identifies the tone without requiring the use of the system processor. Thus the present invention is a resource which can be implemented in e.g. a switching system and which receives as an input signal segments of an analog input signal s(kT).

In an embodiment of the invention, the input signal segments are applied to an envelope detector 1 which determines the instants of arrival and departure of the tones or speech segments of the input signal by forming a simple smoothing operation on the absolute value of the incoming signal. The envelope detector 1 also receives an envelope start threshold on input 3 and an envelope end threshold on input 4.

In one embodiment, the envelope detector is comprised of a smoothing IIR Infinite Impulse Response filter which processes the input signal, which filter performs the translation $$ENV = \frac{2^{15} \cdot ENV + 132 \cdot EDF \cdot S(KT)|1 - 32 \cdot EDF \cdot ENV}{2^{15}}$$

where
ENV is the calculated envelope,
S(KT) is the current sample of the input of the envelope detector,
K is a constant,
T is time, and
EDF is an envelope decay factor which for example could be set to 60.

Figure 1:
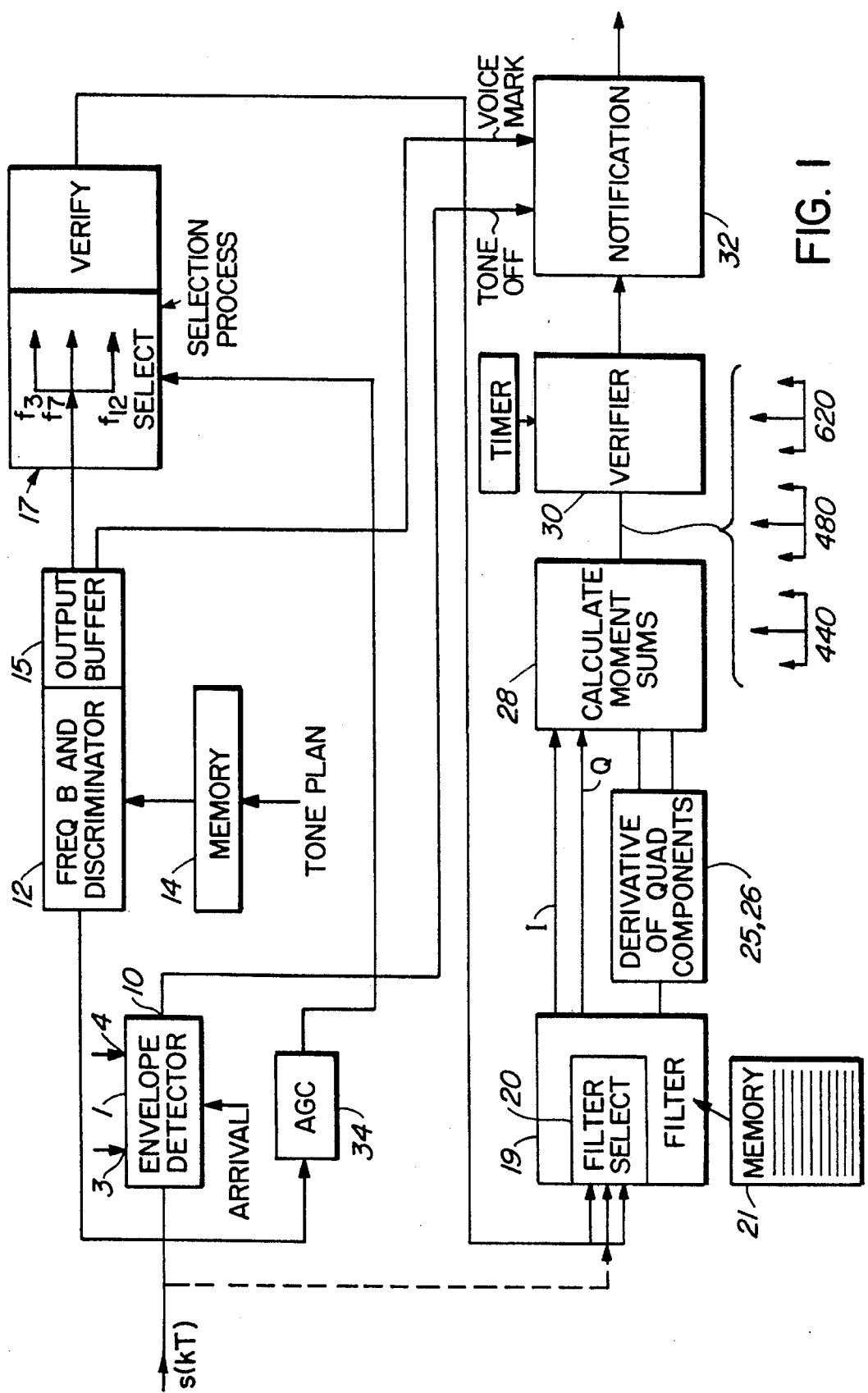

FIG. 1A illustrates the samples 6, the envelope start threshold 7 and the envelope end threshold 8, and also shows the envelope 5 following the curve of the samples 6.

The start threshold 7 could for example be set to −30 dBm and the end threshold 8 could be set to −34 dBm. If during detection the envelope 5 falls below the end threshold for longer than a predetermined time, e.g. 8 ms, the envelope detector indicates at output 10 that the input signal is speech or some other non-progress tone signal. That indication is applied to a notification block at the output of the system which will be described in more detail later. FIG. 1B illustrates the situation in which the envelope 5 is interrupted for sufficient time that it is considered to be representative of speech.

Frequency band discriminator 12, which also receives the input signal, determines in a relatively short period time which frequencies of the tone plan are possibly contained in the input signal. The tone plan data is stored in a memory 14, which could be a register, and which is loaded with tone plan data from an external source such as a system microprocessor, thus making the present invention programmable. The discriminator performs a Real Fast Fourier Transform (RFFT) over preferably 128 input samples. The result of the RFFT analysis is the replacement of the 128 input samples at its output with power spectra thereof, and which can be stored in an output buffer 15. Preferably the power spectra of the 128 input samples is calculated over the frequency range of 0–4,000 Hz (the sampling rate, therefore, being preferably, 8,000 Hz). The 0–4,000 Hz frequency range is divided into 64 "bins", each 62.5 Hz wide.

The discriminator searches for the bins of the highest four frequency spectra. Again, preferably, those bins holding power of less than 1/8th of the power in the highest powered bin are dropped from further consideration. The discriminator compares the range of frequencies in the bin containing the highest power with the tone plan tone frequencies; if that bin does not include one of the tone plan frequencies, the discriminator outputs a signal indicating that the input signal is speech (voice) or some other signal not of concern.

The power spectra of the bins which have not been dropped are checked to contain at least a frequency in the tone plan; typically one or two such frequencies, i.e. bins, will qualify, although three or more frequencies could qualify. If three or more frequencies qualify, the three which belong to bins with the maximum amount of power are retained and the rest are disqualified.

The current detection phase concludes whereby another, lowest powered frequency is disqualified.

However if only a single bin remains, of course there will be no disqualifying step. The power spectra analysis and the decision of what phase to enter, and what frequencies are considered, is effected within a selection process block 17.

The input signal is then low pass filtered and the quadrature components are determined, in process block 19, referred to herein as the quadrature component block. Here the three spectral moments are calculated. These moments are given by the equations Power estimate:

$$\hat{P} = \frac{1}{T} \int_0^T \{I^2(t) + Q^2(t)\} dt \quad (3)$$

Power means frequency:

$$\hat{f} = \frac{1}{2\pi T \hat{P}} \int_0^T \left\{ I(t) \frac{dQ(t)}{dt} - Q(t) \frac{dI(t)}{dt} \right\} dt \quad (4)$$

Mean square bandwidth:

$$\hat{b}^2 = \frac{1}{4\pi^2 T \hat{P}} \int_0^T \left\{ \left(\frac{dI(t)}{dt}\right)^2 + \left(\frac{dQ(t)}{dt}\right)^2 \right\} dt - \hat{f}^2 \quad (5)$$

where I(t) and Q(t) are the quadrature components of the signal represented as:

$$S(t) = I(t)\cos(2\pi f_o t) - Q(t)\sin(2\pi f_o t)$$

where
$f_o$, the reference frequency, lies near the center of the signals' spectrum, and
t is time.

In a digital implementation the integral ($\int$) is replaced by summation ($\Sigma$) and the sums required to calculate the spectral moments are:

$$\Sigma_1 = \sum_{K=1}^{N} \{I^2(KT) + Q^2(KT)\}$$

$$\Sigma_2 = \sum_{K=1}^{N} \left\{ I(KT) \frac{dQ}{DT}(KT) - Q(KT) \frac{dI(KT)}{dt} \right\}$$

$$\Sigma_3 = \sum_{K=1}^{N} \left\{ \left(\frac{dI(KT)}{dt}\right)^2 + \left(\frac{dQ(KT)}{dt}\right)^2 \right\}$$

The derivatives of the quadrature components I(KT) and Q(KT) could be calculated with the approximation formula:

$$\frac{dx(nT)}{dt} = \frac{x\{(n+1)T\} - x\{(n-1)T\}}{2T}$$

where n is a sample number.

The quadrature components I(KT) and Q(KT) can be calculated from the input signal S(KT) by the following procedure:

I(KT) is calculated by low-pass filtering the product S(KT)·x2 cos(2π$f_o$KT).

Q(KT) is calculated by low-pass filtering the product S(KT)·x(−2 sin(2π$f_o$KT)).

The same low-pass filter could be used in both filterings. The filter 20 is selected from a bank of 10 IIR elliptical filters with fixed coefficients stored permanently in a memory 21 (they could alternatively be stored in ROM). Table 1 illustrates filter coefficients and characteristics.

The passband of the low-pass filter is calculated such that it encompasses one and only one frequency of the input tone.

However, in general, a larger frequency band yields better results in calculating the three sums $\Sigma_1, \Sigma_2, \Sigma_3$.

TABLE 1

| No. | fm[Hz] | a(1,2) a(2,2) | a(1,3) a(2,3) | b(1,1) b(2,1) | b(1,2) b(2,2) | b(1,3) b(2,3) | Ripple [dB] Passband | Stopband |
|---|---|---|---|---|---|---|---|---|
| 1 | 20.346 | 32452 32690 | −32142 −32621 | 13000 13000 | −25959 −25993 | 13000 13000 | 0.723 | −28.62 |
| 2 | 30.233 | 32299 32649 | −31843 −32551 | 12968 12968 | −35866 −25921 | 13002 13002 | 0.470 | −27.56 |
| 3 | 40.226 | 32144 32605 | −31543 −32480 | 12938 12938 | −25752 −25848 | 12938 12938 | 0.123 | −28.33 |
| 4 | 49.835 | 31995 32561 | −31257 −32411 | 12911 12911 | −25632 −25780 | 12911 12911 | 0.196 | −28.06 |
| 5 | 60.205 | 31834 32511 | −30952 −32338 | 12884 12884 | −25492 −25707 | 12884 12884 | 0.322 | −27.95 |
| 6 | 69.885 | 31684 32462 | −30669 −32269 | 12851 12861 | −25351 −35639 | 12861 12861 | 0.154 | −28.16 |
| 7 | 79.973 | 31528 32409 | −30377 −32198 | 12839 12839 | −25194 −25570 | 12839 12839 | 0.138 | −28.13 |
| 8 | 90.173 | 31370 32353 | −30085 −32126 | 12819 12819 | −25025 −25501 | 12819 12810 | 0.147 | −28.29 |
| 9 | 99.728 | 21222 32299 | −29814 −32059 | 12802 12802 | −24858 −25437 | 12802 12802 | 0.126 | −28.14 |
| 10 | 110.063 | 31062 32238 | −29524 −31986 | 12786 12786 | −24667 −25369 | 12786 12786 | 0.145 | −28.28 |

As an example assume that as a result of the predetection process (frequency band discrimination step) it is found that the input signal is formed, most probably, of one or maximum two frequencies from the set of three frequencies related by:

$$f_1 < f_2 < f_3$$

The filter is selected using the formula $$\max\left(\text{fix}\left(\frac{\min(f2-f1, f3-f2)}{20}\right) - 1, 1\right)$$

If during pre-detection it is determined that only two frequencies ($f_1 < f_2$) qualify for verification then the filter is selected with the relation $$\max\left(\text{fix}\left(\frac{f2-f1}{20}\right) - 1, 1\right)$$

If during pre-detection only one frequency is qualified for the verification phase, filter #10 (Table 1) is chosen, because it results in the largest frequency band.

As an example $f_1 = 440$ Hz, $f_2 = 480$ Hz, $f_3 = 620$ Hz
$f_2 - f_1 = 40$, $f_3 - f_2 = 140$
$\min(f_2 - f_1, f_3 - f_2) = 40$ $$\text{fix}\left(\frac{40}{20}\right) = 2$$

$\max(2-1, 1) = 1$ where fix is a mathematical operator meaning the lower constant of a constant plus a fractional value.

In this case, filter #1 (Table 1) is chosen from the filter memory 21 and the next phase (detection) will use its coefficients for executing the low-pass process as the result of which the quadrature components I(KT) and Q(KT) are calculated.

In this numerical example assume that three frequency bands have been determined:

| | Bin Range |
|---|---|
| I - centered on $f_o = 440$ Hz | $(440 - f_m, 440 + f_m)$ |
| II - centered on $f_o = 480$ Hz | $(480 - f_m, 480 + f_m)$ |
| III - centered on $f_o = 620$ Hz | $(620 - f_m, 620 + f_m)$ |

While frequency band No. III could be larger because $f_3 - f_2 = 140$ while $f_2 - f_1 = 40$ Hz, for proper comparison of the spectral moments corresponding to each frequency band they all must have the same bandwidth.

Figure 2:
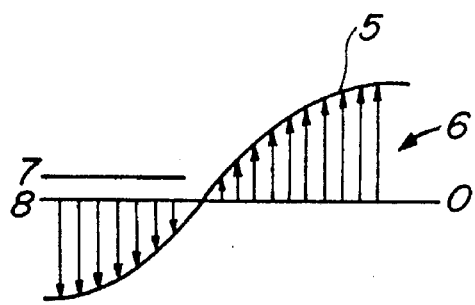
Figure 2:
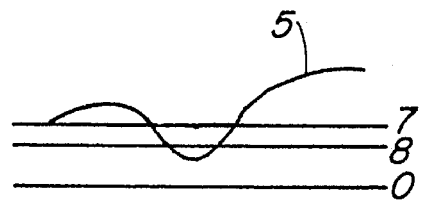
Figure 2:
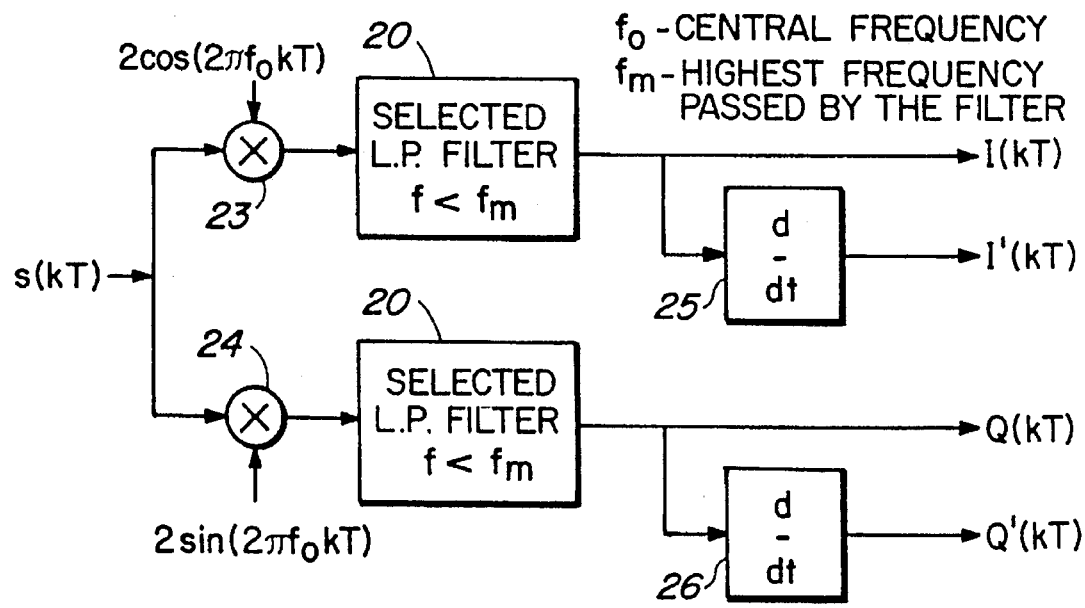

FIG. 2 illustrates in more detail the portion of elements 20 which provides the quadrature and quadrature derivative signals. The input signal is S(KT), which is applied to two multipliers 23 and 24. A signal $2\cos(2\pi f_0 KT)$ is applied to multiplier 23, and a signal $2\sin(2\pi f_0 KT)$ is applied to the multiplier 24. The resulting quadrature shifted signals are applied to the selected low-pass filters 20, wherein $f < f_m$; $f_0$ is the central frequency of the bin and $f_m$ is the highest frequency passed by the corresponding filter. The outputs of the filter are the mutually quadrature shifted signals I(KT) and Q(KT). The derivative of each of these signals is obtained in derivative process blocks 25 and 26.

The outputs of the filters can now be processed through either of two processes, a detection process or a verification process.

During the detection process, the first spectral moment only is processed. When a detection timer expires, the frequency band (bin) with the lowest first spectral moment is dropped, and the verification phase is entered. All three sums ($\Sigma_1, \Sigma_2$ and $\Sigma_3$) could be calculated in this phase, even if only the first spectral moment is used for the decision.

Thus in process block 28 the sums $\Sigma_1, \Sigma_2$ and $\Sigma_3$ of the spectral moments are calculated.

During the verification phase, when a verification timer expires, all three spectral moments are calculated in moment calculator 28 for the one or two frequency bands which make it to this phase, using the sums $\Sigma_1$, $\Sigma_2$ and $\Sigma_3$ that had been continuously updated for each frequency band centered on $f_1$ (and $f_2$ if we have two frequency bands).

The three spectral moments are verified against predetermined thresholds in verifier block 30. If one of the verification tests, to determine whether the moments are in the allowable range fails, that frequency is considered to be not part of the tone. If none of the frequencies passes all the tests, the input signal to the system is considered to be speech or some other signal such as noise.

Otherwise a one or two frequency component tone is considered, and its presence and a time stamp indicating its arrival is reported to notification block 32.

The threshold test could be to determine whether the moments are above or below the threshold. The thresholds could all be the same.

It had previously been indicated that an output of envelope detector 1 and output discriminator 12 can indicate the presence of voice or another signal. Those voice or other signal indicators are also applied to notification block 32 thus causing the output of block 32 to indicate the presence of speech or noise, or otherwise not to indicate the presence of a progress tone.

It is also preferred that the present system should contain an automatic gain control, shown as AGC block 34. During the data acquisition of the predetection step, the input signal S(KT) is applied to the AGC function. The absolute value of last 64 input samples is added to a 32 bit sum. The final value of the sum is used in an integer division operation to calculate an AGC factor. This factor is applied to the select block 17. Repetition of predetection results in a new AGC factor. The constant use for division is calculated such that a good dynamic range is obtained during detection, while saturation is avoided.

A person understanding this invention may now conceive of alternative structures and embodiments or variations of the above. All of those which fall within the scope of the claims appended hereto are considered to be part of the present invention.

We claim:

1. A method of detecting call progress tones specified in a tone plan, comprising:

(a) calculating a power spectrum of a segment of an input signal containing a call progress tone, (b) discriminating, based on said power spectrum, likely frequencies of the call progress tone, (c) determining likely tone plan frequency bands based on one, two or three of said frequencies, (d) filtering the input signal in said frequency bands and extracting quadrature components of the filtered input signal, (e) calculating three spectral moments of the input signal from all said quadrature components for said frequency bands, and (f) verifying at least one frequency of the call progress tone contained in the input signal based on said spectral moments.

2. A method as defined in claim 1 further including detecting a spectral moment having highest power and indicating said spectral moment having highest power as representing a frequency of the call progress tone.

3. A method as defined in claim 1 in which the frequency determining step is effected by calculating sums of spectral moments for said power spectrum, comparing said sums against predetermined thresholds, and indicating a presence of a particular tone or particular tones in an event that power spectra sums of said particular tone or tones exceed respective ones of said thresholds.

4. A method as defined in claim 3 in which all of said thresholds are equal.

5. A method as defined in claim 1 in which said filtering step is comprised of passing a power spectrum of only one frequency of the input signal.

6. A method of processing an input signal possibly containing call progress tones specified in a tone plan, comprising:

(a) calculating a power spectrum of a segment of the input signal possibly containing a call progress tone, (b) discriminating, based on said power spectrum, likely frequencies of the call progress tone, (c) determining likely tone plan frequency bands based on one, two or three of said frequencies, (d) filtering the input signal in said frequency bands and extracting quadrature components of the filtered input signal, said filtering step being comprised of passing a predetermined number of power spectra through a low pass filter having parameters selected from a table having addresses selected from a formula $$\max\left( \text{fix}\left( \frac{\min(f_2 - f_1, f_3 - f_2)}{20} \right) - 1, 1 \right)$$

wherein $f_1$, $f_2$ and $f_3$ are input signal frequencies and $f_1 < f_2 < f_3$.

7. A method as defined in claim 6 wherein the discriminating step is comprised of passing samples of the input signal through a Fast Fourier Transform transformation.

8. A method as defined in claim 7 including selecting largest four values of calculated power spectra which are contained within the tone plan, and then dropping a frequency of a lowest valued power spectra, to provide three power spectra for subsequent filtering.

9. A method as defined in claim 8 in which the values of the power spectra are selected from sixty-four frequency bins each 62.5 Hz wide across a 4 KHz bandwidth containing frequencies of said tone plan, said bins being segregated in the Fast Fourier transformation step.

10. A method as defined in claim 9 in which the frequency determining step is effected by calculating sums of spectral moments for said power spectra, comparing said sums against predetermined thresholds, and indicating a presence of a particular tone or particular tones in an event that power spectra of said particular tone or tones exceed respective ones of said thresholds.

11. A method as defined in claim 10 further including declaring the input signal as a speech or other non-progress tone signal in an event none of said power spectra exceed said predetermined thresholds.

12. A method as defined in claim 9 further including detecting an envelope of the input signal and indicating the input signal as speech or other non-progress tone signal in an event said envelope does not exceed predetermined envelope beginning and end time thresholds for a predetermined time interval.

13. A method as defined in claim 9 in which the discriminating step includes declaring the input signal as speech or other non-progress tone signal in an event a frequency of a highest power spectrum of said calculated power spectra is not contained in said tone plan.

14. A method as defined in claim 10 in which the frequency determining step is effected by detecting a spectral moment having highest power of said sums and indicating the largest spectral moment as representing a frequency of a call progress tone.

15. A method as defined in claim 12 in which the discriminating step includes declaring the input signal as speech or other non-progress tone signal in an event a frequency of a highest power spectrum of said calculated power spectra is not contained in said tone plan.

16. A method as defined in claim 15 in which the frequency determining step is effected by calculating sums of spectral moments for said calculated power spectra, comparing said sums against predetermined thresholds, and indicating a presence of a particular tone or particular tones in an event that a power spectrum sum of said particular tone or tones exceed respective ones of said thresholds.

17. A method as defined in claim 16 further including declaring the input signal as a speech or other non-progress tone signal in an event none of said calculated power spectra exceed said thresholds.

* * * * *